(12) United States Patent
Coupland

(10) Patent No.: US 9,278,338 B2
(45) Date of Patent: Mar. 8, 2016

(54) CATALYST MANUFACTURING METHOD

(75) Inventor: Duncan Roy Coupland, High Wycombe (GB)

(73) Assignee: Johnson Matthey PLC, London (GB)

( * ) Notice: Subject to any disclaimer, the term of this patent is extended or adjusted under 35 U.S.C. 154(b) by 63 days.

(21) Appl. No.: 13/821,443

(22) PCT Filed: Aug. 22, 2011

(86) PCT No.: PCT/GB2011/051582
§ 371 (c)(1),
(2), (4) Date: May 20, 2013

(87) PCT Pub. No.: WO2012/032325
PCT Pub. Date: Mar. 15, 2012

(65) Prior Publication Data
US 2013/0230721 A1    Sep. 5, 2013

(30) Foreign Application Priority Data

Sep. 8, 2010  (GB) .................................. 1014950.8

(51) Int. Cl.
| | | |
|---|---|---|
| *B01J 21/12* | (2006.01) | |
| *B01J 21/04* | (2006.01) | |
| *B01J 23/02* | (2006.01) | |
| *B01J 23/06* | (2006.01) | |
| *B01J 23/08* | (2006.01) | |
| *B01J 23/10* | (2006.01) | |
| *B01J 23/16* | (2006.01) | |
| *B01J 23/40* | (2006.01) | |
| *B01J 23/70* | (2006.01) | |
| *B01J 35/02* | (2006.01) | |
| *B01J 37/00* | (2006.01) | |
| *B01J 37/14* | (2006.01) | |
| *B01J 37/18* | (2006.01) | |
| *B22F 3/105* | (2006.01) | |
| *C10G 2/00* | (2006.01) | |
| *C10G 25/00* | (2006.01) | |
| *C10G 45/04* | (2006.01) | |
| *B01D 53/94* | (2006.01) | |

(52) U.S. Cl.
CPC *B01J 21/12* (2013.01); *B01J 21/04* (2013.01); *B01J 23/02* (2013.01); *B01J 23/06* (2013.01); *B01J 23/08* (2013.01); *B01J 23/10* (2013.01); *B01J 23/16* (2013.01); *B01J 23/40* (2013.01); *B01J 23/70* (2013.01); *B01J 35/026* (2013.01); *B01J 37/0018* (2013.01); *B01J 37/14* (2013.01); *B01J 37/18* (2013.01); *B22F 3/1055* (2013.01); *C10G 2/00* (2013.01); *C10G 25/003* (2013.01); *C10G 45/04* (2013.01); *B01D 53/9436* (2013.01); *B01D 2255/92* (2013.01); *C10G 2300/202* (2013.01); *C10G 2300/205* (2013.01); *C10G 2300/705* (2013.01); *Y10T 428/2982* (2015.01); *Y10T 428/2991* (2015.01)

(58) Field of Classification Search
CPC ............ B01J 21/12; B01J 21/04; B01J 23/02; B01J 23/06; B01J 23/08; B01J 23/10; B01J 23/16; B01J 23/40; B01J 23/70; B01J 35/026; B01J 37/0018; B01J 37/14; B01J 37/18; B22F 3/1055; C10G 2/00; C10G 25/003; C10G 45/04; Y10T 428/2991; Y10T 428/2982
USPC .................. 428/403; 427/212, 269, 287, 402
See application file for complete search history.

(56) References Cited

U.S. PATENT DOCUMENTS

| | | | | |
|---|---|---|---|---|
| 5,756,223 | A  * | 5/1998 | Cameron et al. ............... | 428/688 |
| 6,130,182 | A  * | 10/2000 | Naeem .......................... | 502/328 |
| 6,193,832 | B1 * | 2/2001 | Naeem .......................... | 156/250 |
| 2003/0228432 | A1 | 12/2003 | Estrin et al. | |
| 2007/0245950 | A1 | 10/2007 | Teulet | |
| 2010/0222209 | A1 | 9/2010 | Kashani-Shirazi et al. | |
| 2011/0135840 | A1 | 6/2011 | Doye et al. | |

FOREIGN PATENT DOCUMENTS

| | | |
|---|---|---|
| CN | 1552663 A | 12/2004 |
| CN | 101524647 A | 9/2009 |
| EP | 0 431 924 A2 | 6/1991 |
| EP | 0431924   * | 6/1991 |
| EP | 1 366 808 A2 | 12/2003 |
| EP | 1366808   * | 12/2003 |
| JP | 2006-527065 | 11/2006 |
| WO | WO 95/11752 | 5/1995 |
| WO | WO-2005/002764 A1 | 1/2005 |
| WO | WO 2006/009453 A1 | 1/2006 |
| WO | WO2009/047141   * | 4/2009 |
| WO | WO-2009/047141 A1 | 4/2009 |
| WO | WO2009/156316   * | 12/2009 |
| WO | WO-2009/156316 A1 | 12/2009 |
| WO | WO 2010/029324 A1 | 3/2010 |

OTHER PUBLICATIONS

International Search Report from PCT International Application No. PCT/GB2011/051582, dated Nov. 29, 2011.

* cited by examiner

*Primary Examiner* — Leszek Kiliman
(74) *Attorney, Agent, or Firm* — RatnerPrestia

(57) ABSTRACT

A method for producing a catalyst using an additive layer method includes:
 (i) forming a layer of a powdered catalyst or catalyst support material,
 (ii) binding or fusing the powder in said layer according to a predetermined pattern,
 (iii) repeating (i) and (ii) layer upon layer to form a shaped unit, and
 (iv) optionally applying a catalytic material to said shaped unit.

12 Claims, 2 Drawing Sheets

CATALYST MANUFACTURING METHOD

CROSS-REFERENCE TO RELATED APPLICATIONS

This application is the U.S. National Phase application of PCT International Application No. PCT/GB2011/051582, filed Aug. 22, 2011, and claims priority of British Patent Application No. 1014950.8, filed Sep. 8, 2010, the disclosures of both of which are incorporated herein by reference in their entireties for all purposes.

FIELD OF THE INVENTION

This invention relates to the manufacture of catalysts by additive layer manufacturing.

BACKGROUND OF THE INVENTION

Heterogeneous catalysts are typically manufactured by pelleting, extruding or granulating a powdered catalytic metal compound followed by a calcination, and/or optionally a reduction stage. Alternatively, catalyst supports formed by pelleting or extruding catalytically inert materials may be impregnated with solutions of catalyst compounds and dried prior to the calcination and/or reduction stages. The pelleting, extrusion and granulating methods while effective, offer limited variability in catalyst geometry and physical properties.

Additive layer manufacturing (ALM) is a technique whereby 2-dimensional layers of powdered materials are sequentially laid down and fused or bound together to form 3-dimensional solid objects. The technique has been developed for the fabrication of metal and ceramic components for use in aerospace and medical applications.

SUMMARY OF THE INVENTION

ALM offers the possibility to produce catalyst structures with complex geometries and properties not possible with conventional forming techniques.

Accordingly the invention provides a method for producing a catalyst using an additive layer method comprising:
(i) forming a layer of a powdered catalyst or catalyst support material,
(ii) binding or fusing the powder in said layer according to a predetermined pattern,
(iii) repeating (i) and (ii) layer upon layer to form a shaped unit, and
(iv) optionally applying a catalytic material to said shaped unit.

The invention further provides a catalyst obtainable by the above method and the use of the catalysts in catalytic reactions.

BRIEF DESCRIPTION OF THE DRAWINGS

The invention is further illustrated by reference to the Figures in which.

DETAILED DESCRIPTION OF THE INVENTION

Figure 1:
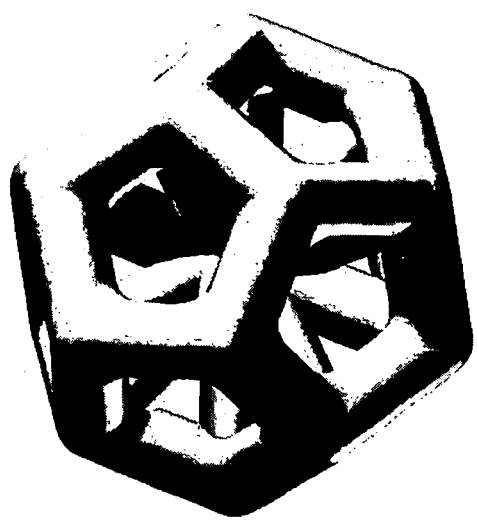
FIG. 1 depicts a wire-frame catalyst structure obtainable by the method of the present invention.

The ALM technique offers major improvements in catalyst performance and a new range of design options including increased geometric surface area to volume ratio, lower specific mass to volume, controlled pore geometry, controlled gas/fluid flow paths, controlled gas/fluid turbulence, controlled gas/fluid residence times, enhanced packing, controlled thermal mass, controlled heat transfer, controlled heat losses, and also higher conversion efficiency and better catalytic selectivity.

The ALM method, which is also known as layer manufacturing, constructive manufacturing, generative manufacturing, direct digital manufacturing, freeform fabrication, solid freeform fabrication or fabbing may be applied to catalyst design using known techniques. In all cases, the ALM processes are enabled by conventional 3D design computer packages that allow design of the shaped unit as a so-called, "STL file", which is a simple mesh depiction of the 3D shape. The STL file is dissected using the design software into multiple two-dimensional layers, which are the basis for the fabrication process. The fabrication equipment, reading the two-dimensional pattern, then sequentially deposits layer upon layer of powder material corresponding to the 2D slices. In order that the shaped unit has structural integrity, the powder material is bound or fused together as the layers are deposited. The process of layer deposition and binding or fusion is repeated until a robust shaped unit is generated. The un-bound or un-fused powder is readily separated from the shaped unit, e.g. by gravity or blowing.

A number of ALM binding and fusion fabrication techniques are available, notably 3D printing and laser sintering techniques. Any of the techniques may however be used.

In laser sintering, the process comprises three steps in which a thin layer of powder material is initially applied to a base plate using a blade, roller, or moving hopper. The thickness of the layer is controlled. Laser radiation is applied in two dimensions to fuse the layer. The laser position is controlled, e.g. using galvanometer mirrors, according to the desired pattern. After the layer is fused, the plate on which the layer rests is moved downwards by the thickness of one layer and a fresh layer of powders screened over the fused later. The procedure is repeated thus producing the shaped unit in three dimensions. After the shape is formed, the un-fused powder is separated from the shaped unit simply by gravity or by blowing it away.

Direct laser sintering performs the process at elevated temperature using a solid state fibre laser. Such a system is commercially available from Phenix Systems, for example as described in WO 2005002764.

An alternative approach is to use a powder material with a polymeric coating or a composition comprising a powder material and a polymeric binder. In this case, the laser acts to melt the binder. This technique has the advantage that the laser power may be considerably lower than the fusion method laser. Polymeric coating technology is available commercially from EOS GmbH.

A further alternative, known as stereolithography, uses the powder as a dispersion in a monomer, which acts as a binder when it is "cured" in layers by photopolymerisation using a UV laser. The powder material may be up to about 60% by volume in the monomer. Suitable equipment for performing this process is available commercially from CeramPilot.

In these methods, but particularly the latter, the shaped unit may be subjected to a subsequent heat treatment, which may be carried out to burn out and remove any polymeric binder and/or alter the physiochemical properties of the shaped unit, such as its strength.

As an alternative to laser sintering or stereolithography, the ALM method may be based on printing of a binder onto the powdered material with or without subsequent heating. Generally this method uses a multiple array ink-jet printing head to spray a layer of a liquid binder on the powder layer to hold the particles together. The support plate moves down in the same manner as previously and again the procedure is repeated building up the shaped unit as before. The layers in this case may be in the range 0.02 to 5.0 mm thick. Subsequent heat treatment is commonly applied to remove the binder. Suitable equipment for performing this process is available commercially from the Z-Corporation in the USA.

The catalyst shaped units produced by the ALM method may be particulate with a cross-sectional size in the range 1-50 mm or the shaped units may be in the form of monoliths, e.g. honeycombs, with cross sections in the range 100-1000 mm. The aspect ratio, i.e. length/width, for the particulate shaped units or monolithic shaped units may be in the range 0.5 to 5.

There is almost no limit to the geometry of the catalyst shaped units that may be fabricated using the ALM technique. The complexity may range from skeletal frame and lattice or lace work structures to multi-featured and facetted robust structures. For example, the shaped unit may be in the form of wire-frame or skeletal framework structures containing a void space within and which may have multiple internal strengthening rods, or the shaped unit may be a honeycomb in any form or a solid unit, such as a cylinder, which may be configured with domed ends, multiple lobes, and/or through holes.

Skeletal framework structures are preferred and may comprise 3 or more open faces which may be trigonal, square, pentagonal, or another polygonal shape. The resulting structures may therefore be tetrahedral, pentahedral (pyramidal), hexahedral (cubic or square antiprism), heptahedral, octahedral, nonahedral, decahedral, dodecahedral, icosahedral, and so on. The skeletal structures may also be linked by external rods to create 2-dimensional or 3-dimensional structures.

Preferably the shaped units comprise one or more through holes, which may be circular, elipsoid, or polygonal, e.g. triangular, square, rectangular, or hexagonal, in cross section. The through holes may comprise two or more through holes running parallel, or non-parallel holes running through the shaped unit at various angles, to the longitudinal axis of the shaped unit. Through holes that are curved may also be produced using the ALM technique, which is currently not possible using conventional pelleting and extrusion techniques.

The shaped units may be prepared from a catalytic material, or may be prepared from a non-catalytic support material and coated with a catalytic material, to provide a catalyst. More than one catalytic material may be applied to the support in single or multiple applications. If desired, a shaped unit prepared from a catalytic material may be further coated with the same or a different catalytic material.

In one embodiment, the powdered material is a catalyst powder. The catalyst powder may comprise a metal powder or powdered metal compound. Preferably, the catalyst powder comprises one or more metals or metal compounds containing metals selected from the group consisting of Na, K, Mg, Ca, Ba, Al, Si, Ti, V, Cr, Mn, Fe, Co, Ni, Cu, Zn, Y, Zr, Nb, Mo, Ru, Rh, Pd, Ag, Sn, Sb, La, Hf, W, Re, Ir, Pt, Au, Pb, or Ce.

Where the catalyst powder is a metal powder, preferably the catalyst powder comprises a precious metal catalyst powder, e.g. comprising one or more of Pt, Pd, Ir, Ru, Re, optionally mixed with one or more transition metals.

Where the catalyst powder is a powdered metal compound, preferably the catalyst powder comprises one or more transition metal compounds, including lanthanide metal compounds and actinide metal compounds. The transition metal compounds may be a metal oxide, metal hydroxide, metal carbonate, metal hydroxycarbonate, or mixture thereof. Transition metal oxides may comprise a single or mixed metal oxide such as a spinel or perovskite, or a composition comprising two or more transition metal oxides.

The catalyst powder may further comprise one or more powdered inert materials such as alumina, silica, silicon nitride, silicon carbide, carbon, and mixtures thereof. Ceramics such as cordierite may also be present.

Alternatively, the catalyst powder may comprise a zeolite.

In an alternative embodiment, the powdered material is a catalyst support powder and the method comprises applying a catalytic material to said shaped unit. The catalyst support powder may comprise one or more inert materials such as alumina, silica, silicon nitride, silicon carbide, carbon, and mixtures thereof. A conventional ceramic catalyst support may also be used. The catalyst support powder may also comprise one or more transition metal compounds, including lanthanide metal compounds and actinide metal compounds, selected from metal oxides, metal hydroxides, metal carbonates, metal hydroxycarbonates, or mixtures thereof. The transition metal compound may comprise a single or mixed metal oxide or a composition comprising two or more transition metal oxides. Preferably, the catalyst support powder comprises an alumina, metal-aluminate, silica, alumino-silicate, titania, zirconia, zinc oxide, or a mixture thereof.

Alternatively, the catalyst support powder may be a metal powder, such as a precious metal powder or a non-precious metal powder such as a ferritic alloy or steel powder.

Alternatively, the catalyst support powder may comprise a zeolite.

The catalytic material applied to the shaped unit may comprise a metal, metal compound or a zeolite.

Catalytic metals may be applied to the shaped unit by metal vapor deposition. Alternatively, the metal, metal compound, or zeolite may be applied to the shaped unit from a solution or dispersion of the metal, metal compound, or zeolite. Particularly suitable metal compounds for application from solution are water-soluble salts such as metal nitrates, metal acetates, formates, or oxalates.

Metal or metal compounds that may be applied to the shaped catalyst support unit preferably comprise one or more metals selected from the group consisting of Na, K, Mg, Ca, Ba, Al, Si, Ti, V, Cr, Mn, Fe, Co, Ni, Cu, Zn, Y, Zr, Nb, Mo, Ru, Rh, Pd, Ag, Sn, Sb, La, Hf, W, Re, Ir, Pt, Au, Pb, or Ce.

The ALM method utilizes a powdered material. The material may be formed as a powder or the material may be converted to powders using various techniques, or example spray drying. Spray drying has the advantage that mixtures of different powder materials may be made, or binder materials applied or free-flowing powders prepared.

Howsoever the powdered materials are prepared, the powdered material preferably has an average particle size, $D_{50}$, in the range 1 to 200 micrometers.

The additive layer manufacturing method preferably comprises a 3D printing or a laser sintering technique. Thus in one embodiment, the powder in each layer is fused by a laser. In another embodiment, the powder in each layer is bound together with a binder, which may be an inorganic binder such as a calcium aluminate cement or an organic binder, such as a phenolic polymer cellulose, gum, or polysaccharide binder.

A burnout additive may be included in the catalyst powder or binder to control the porosity of the resulting shaped unit.

Howsoever the shaped unit is formed it may be desirable to subject it to a subsequent heating step, which may be performed to burn out organic materials such as binders or pore-modifying materials, and/or modify the physiochemical properties, e.g. convert non-oxidic metal compounds into the corresponding metal oxides and/or fuse the powdered material. The heating step may be performed at a maximum temperature in the range 300 to 1400° C., preferably 500 to 1200° C.

Where the shaped unit comprises one or more reducible metal compounds, the shaped unit may be subjected to a reduction step to convert the metal compounds to the corresponding metals. This may be performed directly on the shaped unit without a prior heating step, or may be performed after a heating step, to convert reducible metal oxides to the corresponding metals. The reduction may be achieved by exposing the shaped unit to a hydrogen-containing gas stream at a temperature in the range 150 to 800° C., preferably 150 to 600° C.

Catalysts comprising reduced metals may be pyrophoric and so it is desirable that the reduced metal in the shaped unit is passivated by controlled exposure of the shaped unit to an oxygen-containing gas stream to form a passivating layer on said reduced metal.

The invention includes a catalyst prepared using an ALM method.

The catalysts prepared using the ALM method are suitable for use in any catalytic process, in which a reactant mixture is contacted with the catalyst shaped unit under conditions to effect a catalysed reaction. Alternatively the shaped units may be used in a sorption process to catalytically remove substances from a process fluid, which may be a liquid or a gas.

The catalysed reaction may be selected from hydroprocessing including hydrodesulphurisation, a hydrogenation, steam reforming including pre-reforming, catalytic steam reforming, autothermal reforming and secondary reforming and reforming processes used for the direct reduction of iron, catalytic partial oxidation, a water-gas shift including isothermal-shift, sour shift, low-temperature shift, intermediate temperature shift, medium temperature shift and high temperature shift reactions, a methanation, a hydrocarbon synthesis by the Fischer-Tropsch reaction, methanol synthesis, ammonia synthesis, ammonia oxidation and nitrous oxide decomposition reactions, or selective oxidation or reduction reactions of internal combustion engine or power station exhaust gases.

The ALM method is particularly suitable for manufacturing particulate catalysts for ammonia oxidation and steam reforming and for the monolithic catalysts for the selective oxidation and reduction of components of exhaust gases from internal combustion engines or power stations.

The sorption process may be a sorption selected from the recovery of sulphur compounds or heavy metals such as mercury and arsenic from contaminated gaseous or liquid fluid streams or particulate matter from the exhaust gases of internal combustion engines and power stations. In particular, the method may be applied to manufacture honeycomb-type monolithic structures known as catalytic soot filters.

Figure 2:
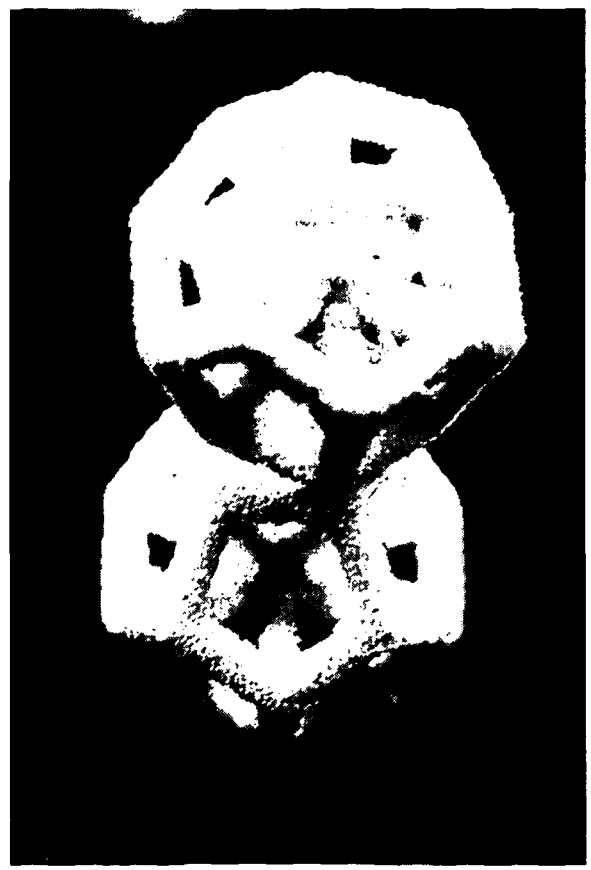
FIG. 2 is an image of a laser-sintered alumina catalyst support with the dodecahedral framework structure of FIG. 1 prepared by the method of the present invention.

In FIGS. 1 and 2, a "wire-frame" catalyst structure is depicted comprising twelve pentagonal faces with twelve internal "rods", connected at the centre of the structure. Such a structure cannot be manufactured using conventional pelleting, extrusion, or granulation techniques.

EXAMPLES

The invention is further illustrated by reference to the following Examples.

Example 1

A wire-frame ammonia oxidation catalyst according to the depiction in FIG. 1 was compared with a commercially available pelleted ammonia oxidation catalyst.

The active area in the shaped unit according to FIG. 1 is approximately 545 $mm^2$. The shape volume is approximately 135 $mm^3$. The filled volume is estimated at approximately 90 $mm^3$.

On this basis, it is predicted that the same conversion efficiency may be provided, under the same operating conditions, by 15-16% of the number of conventional pellets.

Example 2

The dodecahedral frame structure of FIG. 2 was prepared from alumina using a Phenix Systems PX series laser sintering machine. Un-modified alumina powder of approximately 10 microns average size was employed and the build was accomplished using steps of approximately 100 microns, with compression of each new powder layer prior to laser melting. A 300 W fiber laser was used to melt the alumina along the tracks driven by the standard software. As built the parts were fragile and were removed from the powder bed with care. Increased strength may be achieved by post-build sintering at a temperatures up to about 1800° C.

Example 3

Figure 3:
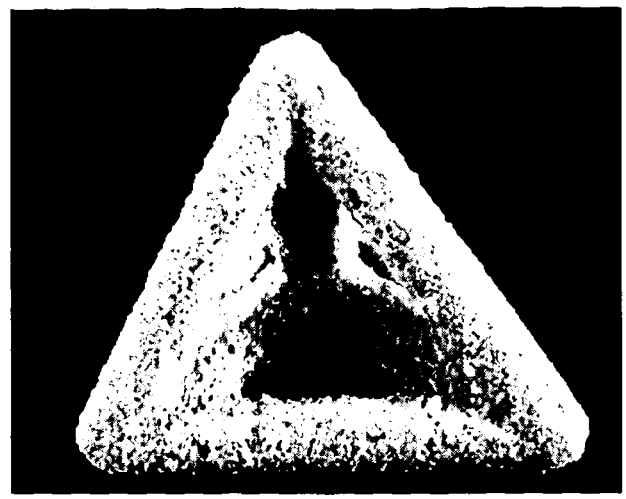
FIG. 3 is an image of a calcined 3D-printed aluminosilicate catalyst support in the form of a tetrahedral framework prepared by the method of the present invention.

"3D-Printing" of the alumina-silica tetrahedral shapes of FIG. 3 was achieved using a Z-Corp 3D printer and standard commercial bonding media. The powder of approximately 30 micron median particle size was printed at 100 micron steps using routine processing conditions. The green structures produced were fired to approximately 1000° C. using a slow ramp up of temperature over approximately 8 hours to allow the bonding agent to burn off and the components to densify (shrink) without loss of integrity. On completion, a quantity of 3D shapes had been manufactured that were sufficiently strong to withstand catalyst coating.

The invention claimed is:

1. A method for producing a particulate catalyst with a cross-sectional size in the range 1-50 mm and an aspect ratio in the range 0.5 to 5 using a 3D printing additive layer method comprising:
   (i) forming a layer of a powdered catalyst support material comprising an alumina, metal-aluminate, silica, alumino-silicate, titania, zirconia, zinc oxide, or a mixture thereof,
   (ii) binding the powder in said layer according to a predetermined pattern,
   (iii) repeating (i) and (ii) layer upon layer to form a shaped unit, and
   (iv) applying a catalytic material to said shaped unit.

2. A method according to claim 1 wherein the catalytic material applied to the shaped unit comprises a metal, metal compound or a zeolite.

3. A method according to claim 2 wherein the metal, metal compound or zeolite is applied to the shaped unit from a solution or dispersion of the metal, metal compound or zeolite.

4. A method according to claim 3 wherein the metal or metal compound comprises one or more metals selected from the group consisting of Na, K, Mg, Ca, Ba, Al, Si, Ti V, Cr, Mn, Fe, Co, Ni, Cu, Zn, Y, Zr, Nb, Mo, Ru, Rh, Pd, Ag, Sn, Sb, La, Hf, W, Re, Ir, Pt, Au, Pb, or Ce.

5. A method according to claim 1 wherein the powdered material has an average particle size, $D_{50}$, in the range 1 to 200 micrometers.

6. A method according to claim 1 wherein the powder in each layer is bound together with a binder.

7. A method according to claim 6 wherein a burnout additive is included in the catalyst powder or binder to control the porosity of the resulting shaped unit.

8. A method according to claim 1 wherein the shaped unit is subjected to a heating step.

9. A method according to claim 1 wherein the shaped unit, comprising one or more reducible metal compounds, is subjected to a reduction step.

10. A method according to claim 1 wherein the shaped unit is a wire-frame structure or a skeletal framework containing a void space within which may have multiple internal strengthening rods.

11. A catalyst obtained by the method of claim 1.

12. A method according to claim 1 wherein the shaped unit is a solid unit, comprising through holes.

* * * * *